US011879602B2

(12) United States Patent
Ko

(10) Patent No.: US 11,879,602 B2
(45) Date of Patent: Jan. 23, 2024

(54) LIGHT SOURCE MODULE FOR PLANT CULTIVATION AND LIGHT IRRADIATION DEVICE INCLUDING THE SAME

(71) Applicant: SEOUL VIOSYS CO., LTD., Gyeonggi-do (KR)

(72) Inventor: Sang Min Ko, Gyeonggi-do (KR)

(73) Assignee: Seoul Viosys Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/108,862

(22) Filed: Feb. 13, 2023

(65) Prior Publication Data

US 2023/0194057 A1  Jun. 22, 2023

Related U.S. Application Data

(63) Continuation of application No. 17/194,906, filed on Mar. 8, 2021, now Pat. No. 11,578,840.

(60) Provisional application No. 62/987,613, filed on Mar. 10, 2020.

(51) Int. Cl.
*F21K 9/64*      (2016.01)
*A01G 7/04*      (2006.01)
*F21K 9/62*      (2016.01)
*F21Y 115/10*    (2016.01)

(52) U.S. Cl.
CPC ............... *F21K 9/64* (2016.08); *A01G 7/045* (2013.01); *F21K 9/62* (2016.08); *F21Y 2115/10* (2016.08)

(58) Field of Classification Search
CPC ........... A01G 7/045; F21K 9/64; F21V 13/08; F21V 3/08; F21V 9/30; F21V 9/32; F21V 9/38
See application file for complete search history.

(56) References Cited

U.S. PATENT DOCUMENTS

| | | | |
|---|---|---|---|
| 9,927,097 | B2 * | 3/2018 | Lalicki .................. H01L 33/502 |
| 2016/0178140 | A1 | 6/2016 | Cho |
| 2017/0030555 | A1 | 2/2017 | Lalicki et al. |
| 2017/0238390 | A1 | 8/2017 | Yamakawa et al. |
| 2017/0345976 | A1 | 11/2017 | Asai |
| 2018/0054975 | A1 | 3/2018 | Shur et al. |

(Continued)

FOREIGN PATENT DOCUMENTS

| | | |
|---|---|---|
| CN | 102382648 A | 3/2012 |
| CN | 105240748 A | 1/2016 |

(Continued)

OTHER PUBLICATIONS

International Search Report for International Application No. PCT/KR2021/002910, dated Jul. 2, 2021, English translation, 2 pages.

(Continued)

*Primary Examiner* — William J Carter
(74) *Attorney, Agent, or Firm* — LaBatt, LLC

(57) ABSTRACT

Disclosed herein are a light source module for plant cultivation and a light device including the same. The light source module for plant cultivation may include at least one main light source emitting white light. The white light from the main light source is provided to a plant during cultivation to improve the growth and phytochemical content of the plant. In addition, the white light may have peak wavelengths of 430 nm or less, 440 nm to 460 nm, 510 nm to 530 nm, and 600 nm to 630 nm.

20 Claims, 7 Drawing Sheets

(56) References Cited

U.S. PATENT DOCUMENTS

| | | | | |
|---|---|---|---|---|
| 2018/0135830 A1* | 5/2018 | Cai | ............... | F21V 3/08 |
| 2019/0183059 A1 | 6/2019 | Yun et al. | | |
| 2019/0191517 A1 | 6/2019 | Adams et al. | | |
| 2020/0010759 A1 | 1/2020 | Benker et al. | | |

FOREIGN PATENT DOCUMENTS

| | | | |
|---|---|---|---|
| CN | 106090706 A | 11/2016 | |
| CN | 107623064 A | 1/2018 | |
| CN | 109103174 A | 12/2018 | |
| CN | 109370593 A | 2/2019 | |
| EP | 2772952 A1 | 3/2014 | |
| EP | 3214359 A1 | 6/2017 | |
| JP | 2002281830 A | 10/2002 | |
| JP | 2015133939 A | 7/2015 | |
| KR | 1020120021415 | 3/2012 | |
| KR | 1020160081470 A | 7/2016 | |
| KR | 1020170040696 | 4/2017 | |
| KR | 1020170090317 A | 8/2017 | |
| KR | 1020200024607 A | 3/2020 | |
| RU | 148495 U1 | 12/2014 | |
| RU | 2565724 C1 | 10/2015 | |
| WO | 2018162375 A2 | 9/2018 | |
| WO | 2018179105 | 10/2018 | |

OTHER PUBLICATIONS

International Search Report for International Application No. PCT/KR2020/010384, dated Nov. 13, 2020, English translation, 3 pages.
Office Action issued in U.S. Appl. No. 17/194,906, dated Sep. 30, 2021, 8 pages.
Final Office Action, U.S. Appl. No. 17/194,906, dated Apr. 11, 2022, 9 pages.
Notice of Allowance, U.S. Appl. No. 17/194,906, dated Aug. 25, 2022, 5 pages.
Notice of Allowance, U.S. Appl. No. 17/194,906, dated Dec. 20, 2022, 5 pages.
Office Action issued in U.S. Appl. No. 16/984,484, dated Sep. 27, 2021, 9 pages.
Final Office Action issued in U.S. Appl. No. 16/984,484, dated Apr. 8, 2022, 11 pages.
Notice of allowance issued in U.S. Appl. No. 16/984,484, dated Aug. 2, 2022, 7 pages.
Notice of allowance issued in U.S. Appl. No. 16/984,484, dated Dec. 8, 2022, 5 pages.
English translation of Office Action for Russian Patent Application No. 2022105788, dated Dec. 21, 2022, 9 pages.
Office Action for Chinese Patent Application No. 202080004538.3 with English translation, dated Feb. 16, 2023, 14 pages.
Search Report for European Patent Application No. 20850031.4, dated Aug. 9, 2023, 9 pages.
Office action for U.S. Appl. No. 18/093,137, dated May 25, 2023, 8 pages.
Notice of allowance for U.S. Appl. No. 18/093,137, dated Nov. 29, 2023, 5 pages.

* cited by examiner

LIGHT SOURCE MODULE FOR PLANT CULTIVATION AND LIGHT IRRADIATION DEVICE INCLUDING THE SAME

CROSS-REFERENCE TO RELATED APPLICATION AND PRIORITY

The present application is a continuation of U.S. patent application Ser. No. 17/194,906, filed on 8 Mar. 2021, which claims priority to and the benefit of U.S. Provisional Application No. 62/987,613, filed Mar. 10, 2020, the disclosures of which are incorporated by reference in their entireties.

BACKGROUND

Field

The present disclosure relates to a light source module for plant cultivation and a light device including the same.

Discussion of the Background

Plants produce organic matter from carbon dioxide and water using light energy through photosynthesis. Plants use chemical energy of organic matter obtained through photosynthesis as nutrients for growth.

As a luminaire for plant cultivation, various light sources have been developed and used to replace or supplement sunlight. Light sources such as incandescent lamps and fluorescent lamps have mainly been used as luminaires for plant cultivation. However, most typical luminaires for plant cultivation only provide light having a specific wavelength suitable for photosynthesis of plants and do not have any additional functions.

Plants can synthesize substances useful to humans through resistance to various stresses. Therefore, there is a need for a light source for plant cultivation, which can promote production of substances useful to humans in a plant, a cultivation apparatus including the same, and a cultivation method using the same.

The above information disclosed in this section is only for aid in understanding of the background of the inventive concepts and thus may contain information that does not constitute prior art.

SUMMARY

Embodiments of the present disclosure provide a light source for plant cultivation, which can improve the growth of a plant, and a light device including the same.

In addition, embodiments of the present disclosure provide a light source for plant cultivation, which can improve the growth and phytochemical content of a plant, and a light device including the same.

In accordance with one embodiment of the present disclosure, a light source module for plant cultivation includes at least one main light source emitting white light. The white light from the main light source is provided to a plant during cultivation to improve the growth and phytochemical content of the plant. In addition, the white light may have peak wavelengths of 430 nm or less, 440 nm to 460 nm, 510 nm to 530 nm, and 600 nm to 630 nm.

In accordance with another embodiment of the present disclosure, a light device including the light source module for plant cultivation set forth above.

The light source for plant cultivation and the light device according to the embodiments of the present disclosure can improve the growth of a plant.

In addition, the light source for plant cultivation and the light device according to the embodiments of the present disclosure can improve the phytochemical content of a plant.

Accordingly, the light device for plant cultivation and the light device according to the embodiments of the present disclosure can increase the yield of phytochemicals per plant.

BRIEF DESCRIPTION OF THE DRAWINGS

The accompanying drawings, which are included to provide further understanding of the present disclosure and are incorporated in and constitute a part of this specification, serve to illustrate exemplary embodiments of the present disclosure and to explain the inventive concepts in conjunction with the detailed description below.

DETAILED DESCRIPTION

Figure 1:
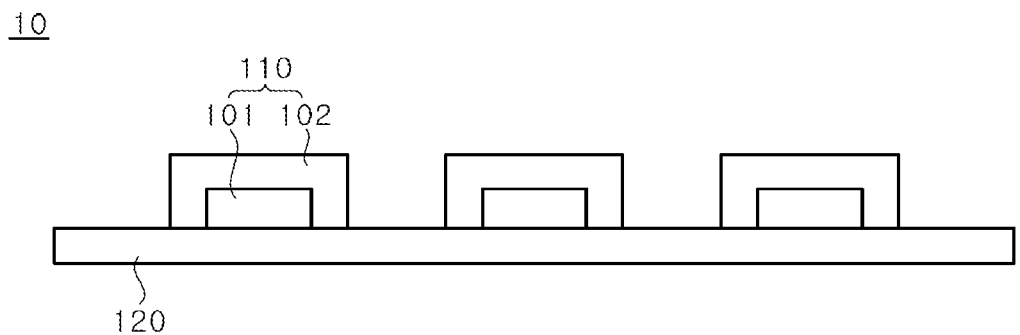
FIG. 1 is a schematic view of a first light source module according to one embodiment of the present disclosure.

In the following description, for the purposes of explanation, numerous specific details are set forth in order to provide thorough understanding of various exemplary embodiments or implementations of the present disclosure.

As used herein, "embodiments" and "implementations" are interchangeable terms for non-limiting examples of devices or methods employing one or more of the inventive concepts disclosed herein. It will be apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects (hereinafter individually or collectively referred to as "elements") of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, and property of the elements, unless specified. Further, in the accompanying drawings, the size and relative sizes of elements may be exaggerated for clarity and/or descriptive purposes. When an exemplary embodiment is implemented differently, a specific process order may be performed differently from the described order. For example, two consecutively described processes may be performed substantially at the same time or performed in an order opposite the described order. In addition, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the DR1-axis, the DR2-axis, and the DR3-axis are not limited to three axes of a rectangular coordinate system, such as the x, y, and z-axes, and may be interpreted in a broader sense. For example, the DR1-axis, the DR2-axis, and the DR3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," and the like may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (for example, as in "sidewall"), and the like, may be used herein for descriptive purposes, and, thereby, to describe one element's relationship to other element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (for example, rotated 90 degrees or at other orientations), and, as such, the spatially relative descriptors used herein may likewise interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Various exemplary embodiments are described herein with reference to sectional and/or exploded illustrations that are schematic illustrations of idealized exemplary embodiments and/or intermediate structures. As such, variations from the shapes of the illustrations as a result, for example, of manufacturing techniques and/or tolerances, are to be expected. Thus, exemplary embodiments disclosed herein should not necessarily be construed as limited to the particular illustrated shapes of regions, but are to include deviations in shapes that result from, for instance, manufacturing. In this manner, regions illustrated in the drawings may be schematic in nature and the shapes of these regions may not reflect actual shapes of regions of a device and, as such, are not necessarily intended to be limiting.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (for example, microcode) to perform various functions discussed herein and may optionally be driven by firmware and/or software. It is also contemplated that each block, unit, and/or module may be implemented by dedicated hardware, or as a combination of dedicated hardware to perform some functions and a processor (for example, one or more programmed microprocessors and associated circuitry) to perform other functions. Also, each block, unit, and/or module of some exemplary embodiments may be physically separated into two or more interacting and discrete blocks, units, and/or modules without departing from the scope of the inventive concepts. Further, the blocks, units, and/or modules of some exemplary embodiments may be physically combined into more complex blocks, units, and/or modules without departing from the scope of the inventive concepts.

Unless otherwise defined, all terms (including technical and scientific terms) used herein have the same meaning as commonly understood by one of ordinary skill in the art to which this disclosure pertains. Terms, such as those defined in commonly used dictionaries, should be interpreted as having a meaning that is consistent with their meaning in the context of the relevant art and should not be interpreted in an idealized or overly formal sense, unless expressly so defined herein.

In accordance with one embodiment, a light source module for plant cultivation may include at least one main light source emitting white light.

In at least one variant, the white light from the main light source is provided to a plant during cultivation to improve the growth and phytochemical content of the plant.

In addition, the white light may have peak wavelengths of 430 nm or less, 440 nm to 460 nm, 510 nm to 530 nm, and 600 nm to 630 nm.

In another variant, the main light source may include a light emitting diode and a wavelength conversion part covering the light emitting diode.

For example, the light emitting diode of the main light source may emit violet light.

In further another variant, the wavelength conversion part of the main light source may include a light transmissive resin and blue, green, and orange phosphors dispersed in the light-transmitting resin.

The white light from the main light source may have a color temperature of 5000 K.

The light source module for plant cultivation may further include an auxiliary light source emitting auxiliary light necessary for photosynthesis of the plant.

The auxiliary light may be red light having a peak wavelength of 630 nm to 670 nm.

The auxiliary light source may include a light emitting diode and a wavelength conversion part covering the light emitting diode.

For example, the light emitting diode of the auxiliary light source may emit blue light.

In at least one variant, the wavelength conversion part of the auxiliary light source may include a red phosphor.

A light device according to one embodiment of the present disclosure may include the light source module set forth above.

An experiment was performed to determine changes in growth and phytochemical content of a plant cultivated using the light source module for plant cultivation according to the embodiment of the present disclosure and the light device including the same.

The plant used in the experiment was red leaf lettuce. Although red leaf lettuce was used as an experimental subject, it will be understood that a plant to which the present disclosure is applicable is not limited thereto.

Red leaf lettuce samples were grown under illumination with the light source module for plant cultivation in a chamber at 20° C. and 60% RH.

In the experiment, the red leaf lettuce samples were illuminated at an irradiance of 200 µmol/m$^2$/s.

In addition, a daily photoperiod during cultivation was set to 16 hours of light and 8 hours of dark.

After cultivating the red leaf lettuce samples for 5 weeks in this environment, the degree of growth and phytochemical content of the samples were determined.

FIG. 1 to FIG. 8 are schematic views of light source modules for plant cultivation according to respective embodiments of the present disclosure and optical spectra of corresponding light source modules, respectively.

In addition, the light source module for plant cultivation according to the present disclosure emits light having a color temperature of about 5000 K.

Figure 2:
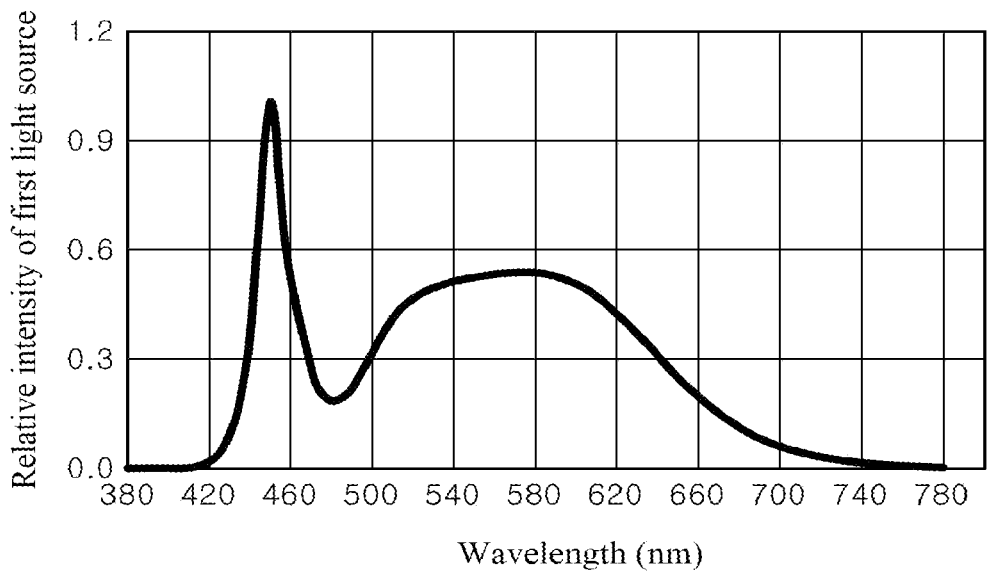
FIG. 2 shows an optical spectrum of the first light source module according to the embodiment.

FIG. 1 is a schematic view of a first light source module according to one embodiment. FIG. 2 shows an optical spectrum of the first light source module according to the embodiment.

For example, the first light source module 10 may include a substrate 120 and at least one first light source 110 mounted on the substrate 120.

The first light source 110 may include a first light emitting diode 101 and a first wavelength conversion part 102 covering the first light emitting diode 101.

For example, the first light emitting diode 101 may emit blue light by receiving power through the substrate 120.

In addition, the first wavelength conversion part 102 may include a light transmissive resin and green and red phosphors dispersed in the light transmissive resin.

Accordingly, the first light source module 10 may emit white light in which blue light from the first light emitting diode 101 is mixed with green light from the green phosphor and red light from the red phosphor.

Referring to FIG. 2, a first type of light, that is, white light emitted from the first light source module 10, has a peak wavelength of about 440 nm to 460 nm.

For example, the first type of light may have a peak wavelength of about 450 nm.

In addition, the first type of light emitted from the first light source module 10 may have an irradiance of 200 µmol/m$^2$/s.

Figure 3:
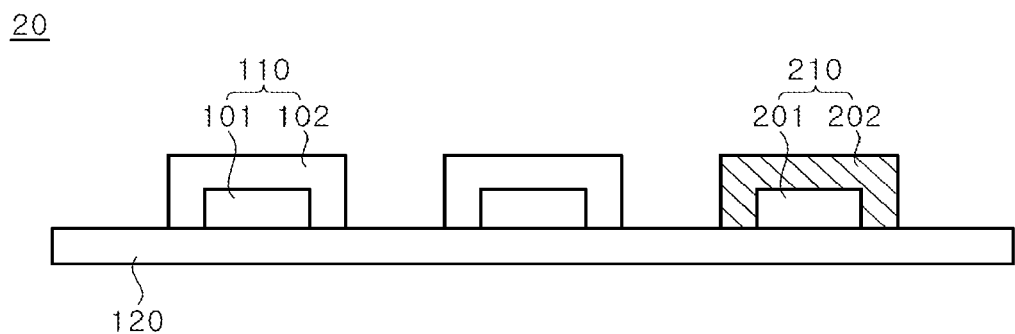
FIG. 3 is a schematic view of a second light source module according to one embodiment of the present disclosure.
Figure 4:
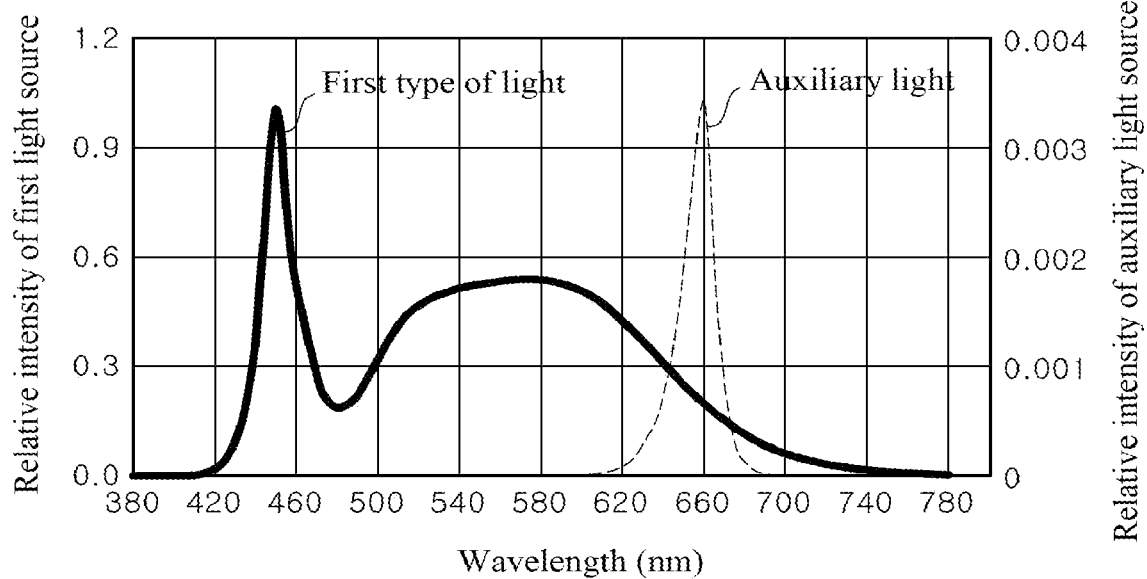
FIG. 4 shows an optical spectrum of the second light source module according to the embodiment.

FIG. 3 is a schematic view of a second light source module according to one embodiment of the present disclosure. FIG. 4 shows an optical spectrum of the second light source module according to the embodiment.

For example, the second light source module 20 may include a substrate 120, at least one first light source 110, and at least one auxiliary light source 210. The first light source 110 and the auxiliary light source 210 may emit light by receiving power through the substrate 120.

In the second light source module 20, the first light source 110 is a main light source emitting white light. In addition, the first light source 110 of the second light source module 20 may be the same as the first light source (110 of FIG. 1) of the first light source module (10 of FIG. 1).

The auxiliary light source 210 may serve to provide light necessary for photosynthesis of the plant as a supplement to the white light from the first light source 110.

The auxiliary light source 210 may include a second light emitting diode 201 emitting blue light and a second wavelength conversion part 202 with a red phosphor dispersed therein.

For example, the auxiliary light emitted from the auxiliary light source 210 may be red light having a peak wavelength of about 630 nm to about 670 nm.

Accordingly, the second light source module 20 may emit a second type of light including white light emitted from the first light source 110 and red light emitted from the auxiliary light source 210.

Referring to FIG. 4, the second light source module 20 may emit the second type of light including white light having a peak wavelength of about 450 nm and auxiliary light having a peak wavelength of about 660 nm.

In addition, the second type of light emitted from the second light source module 20 may have an irradiance of 200 μmol/m²/s. Here, the white light may have an irradiance of 150 μmol/m2/s and the auxiliary light may have an irradiance of 50 μmol/m²/s.

Figure 5:
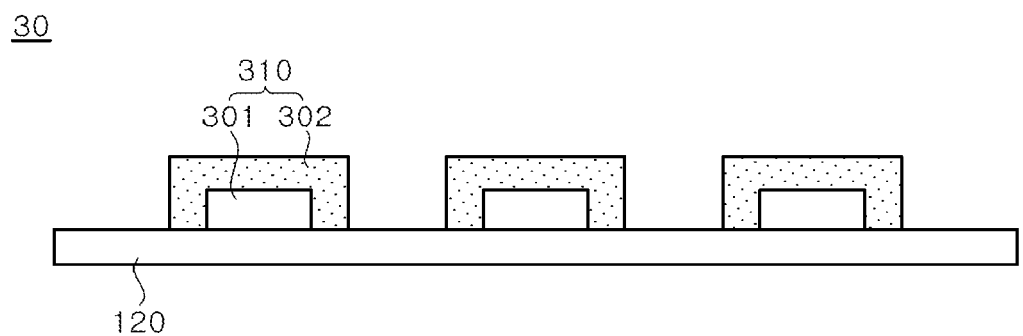
FIG. 5 is a schematic view of a third light source module according to one embodiment of the present disclosure.
Figure 6:
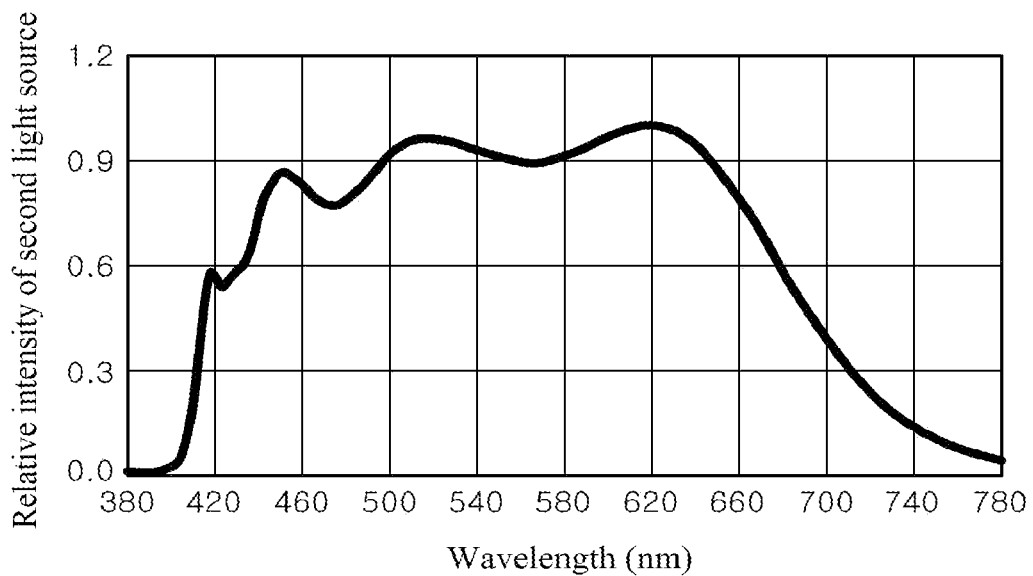
FIG. 6 shows an optical spectrum of the third light source module according to the embodiment.

FIG. 5 is a schematic view of a third light source module according to one embodiment of the present disclosure. FIG. 6 shows an optical spectrum of the third light source module according to the embodiment.

For example, the third light source module 30 may include a substrate 120 and at least one second light source 310 electrically connected to the substrate 120.

The third light source module 30 may emit a third type of light, which is white light having a different spectrum from the white light from the first light source module (10 of FIG. 1).

For example, the second light source 310 may include a third light emitting diode 301 emitting violet light and a third wavelength conversion part 302.

The third wavelength conversion part 302 may include a light transmissive resin and blue, green, and orange phosphors dispersed in the light transmissive resin.

Accordingly, the second light source 310 may emit the third type of light which is white light as violet light emitted from the third light emitting diode 301 is mixed with blue light from the blue phosphor, green light from the green phosphor, and orange light from the orange phosphor.

The third type of light emitted from the third light source module 30 may have more peak wavelengths over the entire visible spectrum than the first type of light (FIG. 2) emitted from the first light source module (10 of FIG. 1).

Referring to FIG. 6, the third light source module 30 may emit the third type of light having peak wavelengths of about 430 nm or less, about 440 nm to 460 nm, about 510 nm to 530 nm, and about 600 nm to 630 nm.

For example, the third light source module 30 may emit the third type of light having peak wavelengths of about 418 nm, about 451 nm, about 515 nm, and about 617 nm.

As such, the third type of light emitted from the third light source module 30 has a spectrum similar to that of the visible component of sunlight.

The third type of light emitted from the third light source module 30 may have an irradiance of 200 μmol/m²/s.

FIG. 7 to FIG. 11 are graphs comparing the growth and phytochemical content of red leaf lettuce between experimental groups cultivated using the first to third light source modules for plant cultivation according to the respective embodiments of the present disclosure.

In FIG. 7 to FIG. 11, Experimental group 1 is a group of red leaf lettuce samples cultivated using the first light source module 10 as shown in FIG. 1 and FIG. 2, and Experimental group 2 is a group of red leaf lettuce samples cultivated using the second light source module 20 as shown in FIG. 3 and FIG. 4, and Experimental group 3 is a group of red leaf lettuce samples cultivated using the third light source module 30 as shown in FIG. 5 and FIG. 6.

That is, Experimental group 1 is a group of red leaf lettuce samples cultivated under illumination with the first type of light, Experimental group 2 is a group of red leaf lettuce samples cultivated under illumination with the second type of light including the auxiliary light, and Experimental group 3 is a group of red leaf lettuce samples cultivated under illumination with the third type of light having a wide spectrum spanning the entire visible range.

Figure 7:
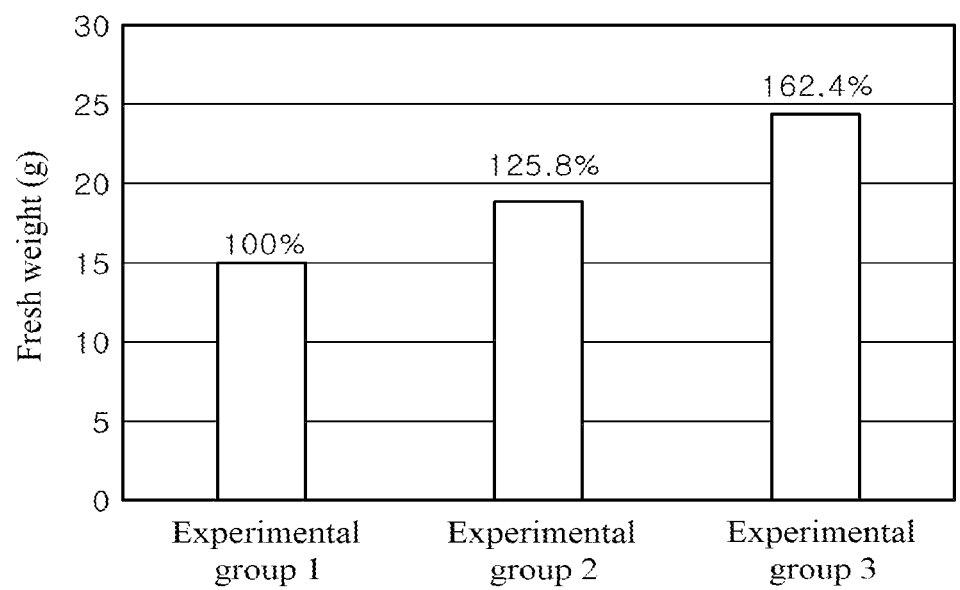
FIG. 7 is a graph which compares fresh weights of plant samples cultivated using the light source modules for plant cultivation according to the respective embodiments of the present disclosure.

FIG. 7 is a graph which compares the fresh weight of red leaf lettuce between experimental groups cultivated using the light source modules for plant cultivation according to the respective embodiments of the present disclosure.

Here, the fresh weight was determined by measuring the weight of an aerial part of each of respective red leaf lettuce samples cultivated using the first to third light source modules 10, 20, 30.

Referring to FIG. 7, the fresh weight of red leaf lettuce was the highest in Experimental group 3, followed by Experimental group 2 and Experimental group 1.

The fresh weight was 25.8% higher in Experimental group 2 than in Experimental group 1.

In addition, the fresh weight was 62.4% higher in Experimental group 3 than in Experimental group 1.

Figure 8:
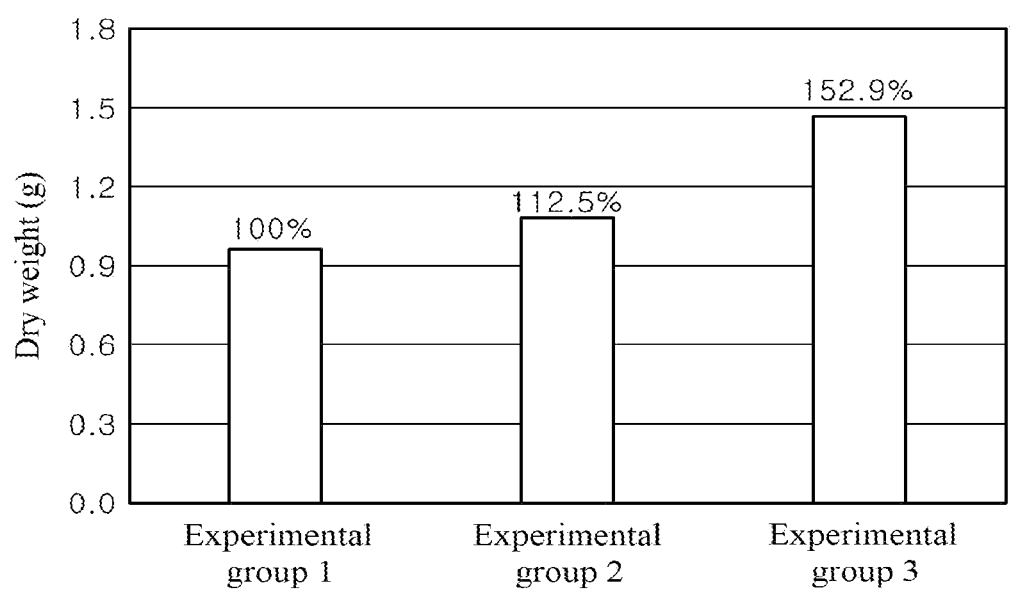
FIG. 8 is a graph which compares dry weights of plant samples cultivated using the light source modules for plant cultivation according to the respective embodiments of the present disclosure.

FIG. 8 is a graph comparing the dry weight of red leaf lettuce among Experimental groups cultivated using the light source modules for plant cultivation according to the respective embodiments of the present disclosure.

Here, the dry weight was determined by measuring the weight of an aerial part of each of the red leaf lettuce samples deep-frozen and freeze-dried with liquid nitrogen.

Referring to FIG. 8, the dry weight of red leaf lettuce was the highest in Experimental group 3, followed by Experimental group 2 and Experimental group 1.

The dry weight was 12.5% higher in Experimental group 2 than in Experimental group 1.

In addition, the dry weight was 52.9% higher in Experimental group 3 than in Experimental group 1.

The fresh weight and the dry weight were both higher in Experimental group 2 than in Experimental group 1.

That is, it can be seen that the auxiliary light having a peak wavelength of about 630 nm to about 670 nm was helpful in growth of red leaf lettuce.

In addition, the fresh weight and the dry weight were both higher in Experimental group 3 than in Experimental group 1 and Experimental group 2.

That is, it can be seen that the third type of light was more effective in improving the growth of red leaf lettuce than the first type of light or the second type of light obtained by adding the auxiliary light to the first type of light.

Figure 9:
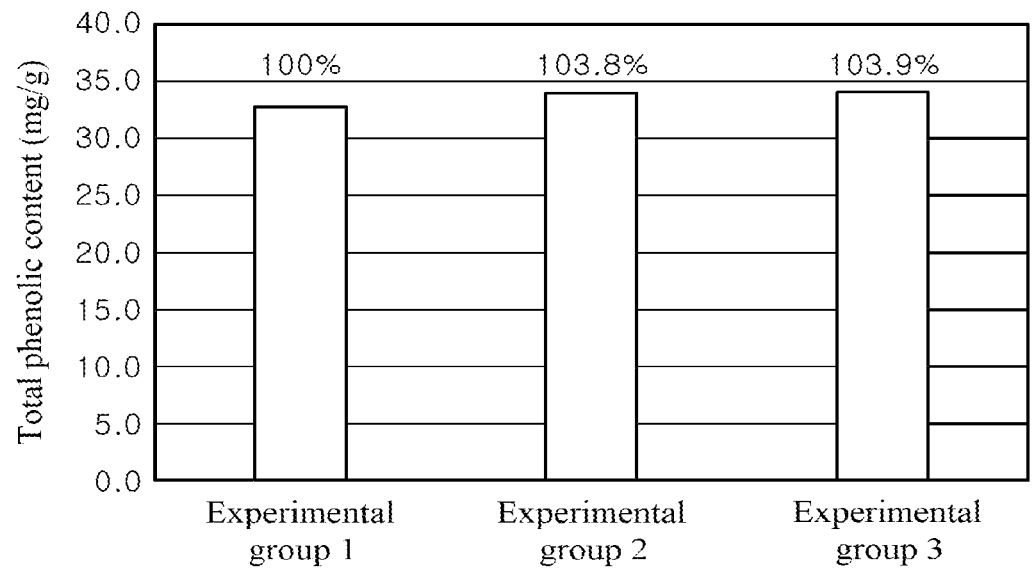
FIG. 9 is a graph showing total phenolic content per unit weight (g) of plant samples cultivated using the light source modules for plant cultivation according to the respective embodiments of the present disclosure.
Figure 10:
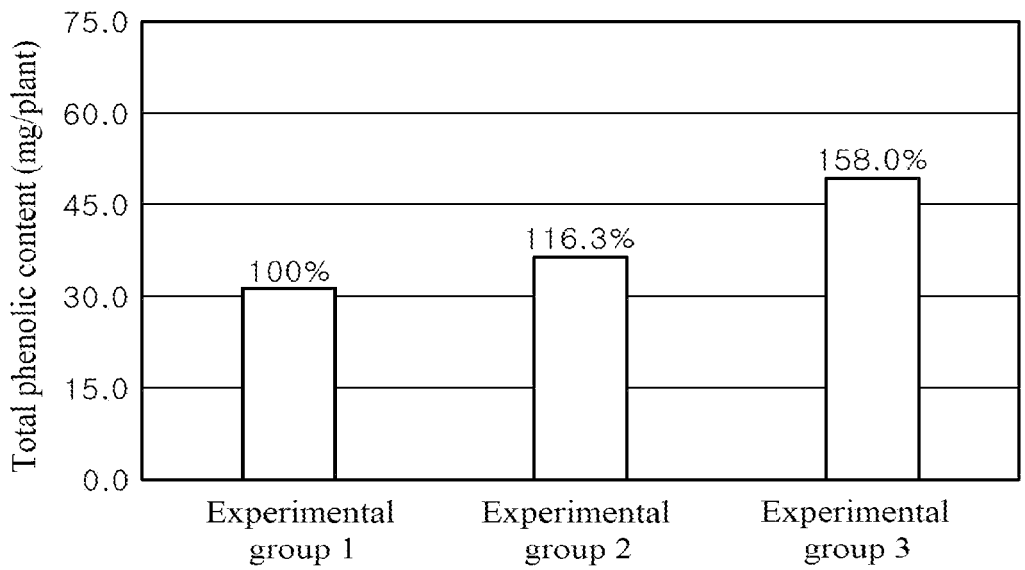
FIG. 10 is a graph showing total phenolic content per plant of plant samples cultivated using the light source modules for plant cultivation according to the respective embodiments of the present disclosure.

FIG. 9 and FIG. 10 are graphs comparing the total phenolic content of red leaf lettuce between experimental groups cultivated using the light source modules for plant cultivation according to the respective embodiments of the present disclosure.

Here, the total phenolic content was calculated by grinding each of freeze-dried red leaf lettuce samples, performing treatment with a reagent according to a total phenol content assay method, and measuring the absorbance of the sample using a spectrophotometer.

FIG. 9 is a graph showing the total phenolic content per unit weight (g) of red leaf lettuce samples cultivated using the light source modules for plant cultivation according to the respective embodiments of the present disclosure.

Referring to FIG. 9, the total phenolic content per unit weight was higher in Experimental group 2 and Experimental group 3 than in Experimental group 1.

That is, it can be seen that the second type of light and the third type of light according to the embodiments of the present disclosure can increase the total phenolic content per unit weight of red leaf lettuce.

In addition, from the results from Experimental group 1 and Experimental group 2, it can be seen that red light, that is the auxiliary light, can increase the total phenolic content per unit weight of red leaf lettuce.

FIG. 10 is a graph showing the total phenolic content per plant of red leaf lettuce samples cultivated using the light source modules for plant cultivation according to the respective embodiments of the present disclosure.

Referring to FIG. 10, the total phenolic content per plant was higher in Experimental group 2 and Experimental group 3 than in Experimental group 1.

The total phenolic content per plant was 16.3% higher in Experimental group 2 than in Experimental group 1 and 58.0% higher in Experimental group 3 than in Experimental group 1.

That is, it can be seen that the second type of light and the third type of light are more effective in increasing the total phenolic content of red leaf lettuce than the first type of light.

Figure 11:
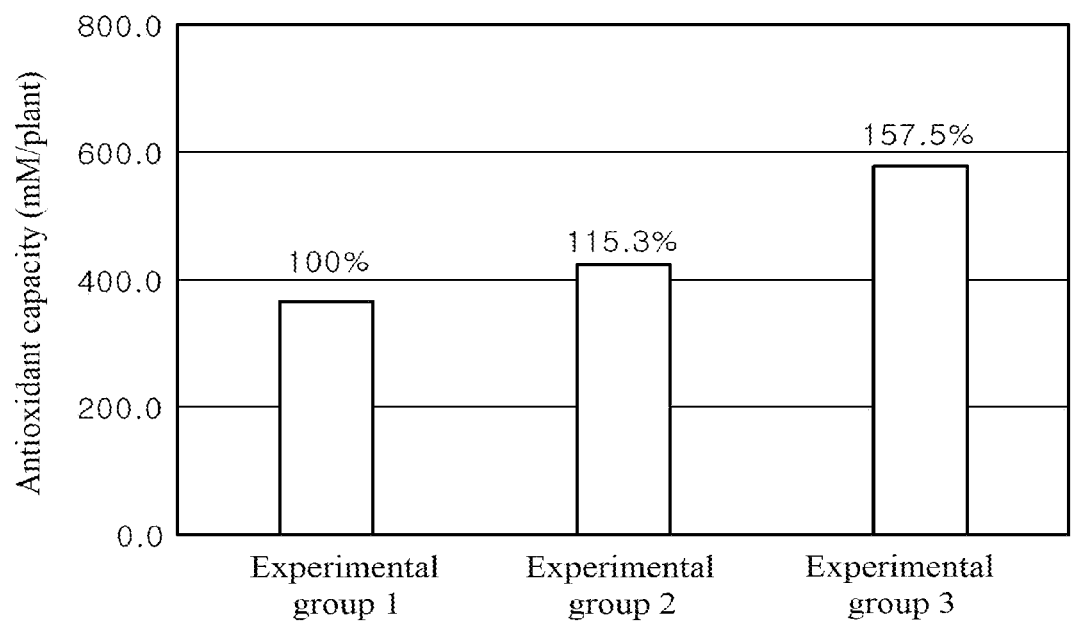
FIG. 11 is a graph showing antioxidant capacity per plant of plant samples cultivated using the light source modules for plant cultivation according to the respective embodiments of the present disclosure.

FIG. 11 is a graph showing the antioxidant capacity per plant of red leaf lettuce samples cultivated using the light source modules for plant cultivation according to the respective embodiments of the present disclosure.

Here, the antioxidant capacity per plant was calculated by grinding each of freeze-dried red leaf lettuce samples, performing treatment with a reagent according to an antioxidant capacity assay method, and measuring the absorbance of the sample using a spectrophotometer.

Referring to FIG. 11, the antioxidant capacity per plant was higher in Experimental group 2 and Experimental group 3 than in Experimental group 1.

The antioxidant capacity per plant was 15.3% higher in experimental group 2 than in experimental group 1 and 57.5% higher in experimental group 3 than in experimental group 1.

That is, it can be seen that the second type of light and the third type of light are more effective in increasing the antioxidant capacity of red leaf lettuce than the first type of light.

Referring to FIG. 7 to FIG. 11, the second type of light is more effective in improving the growth and phytochemical content of red leaf lettuce than the first type of light. That is, it can be seen that red light is helpful in improving the growth and phytochemical content of red leaf lettuce.

In addition, it can be seen that the third type of light is more effective in improving the growth and phytochemical content of red leaf lettuce than the first type of light and the second type of light.

Figure 12:
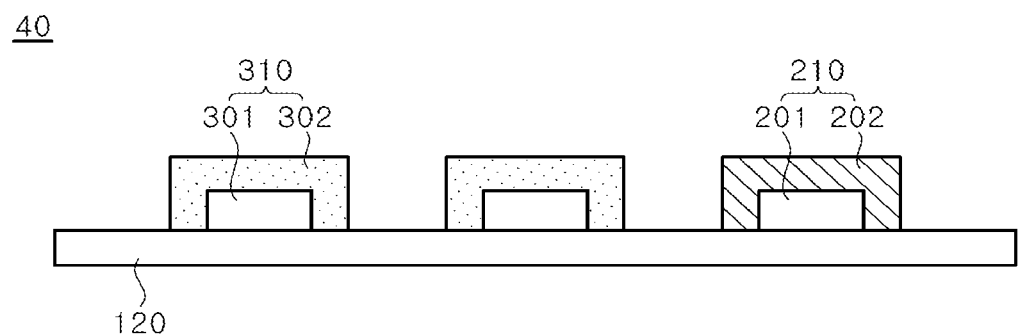
FIG. 12 is a schematic view of a fourth light source module according to the present disclosure.
Figure 13:
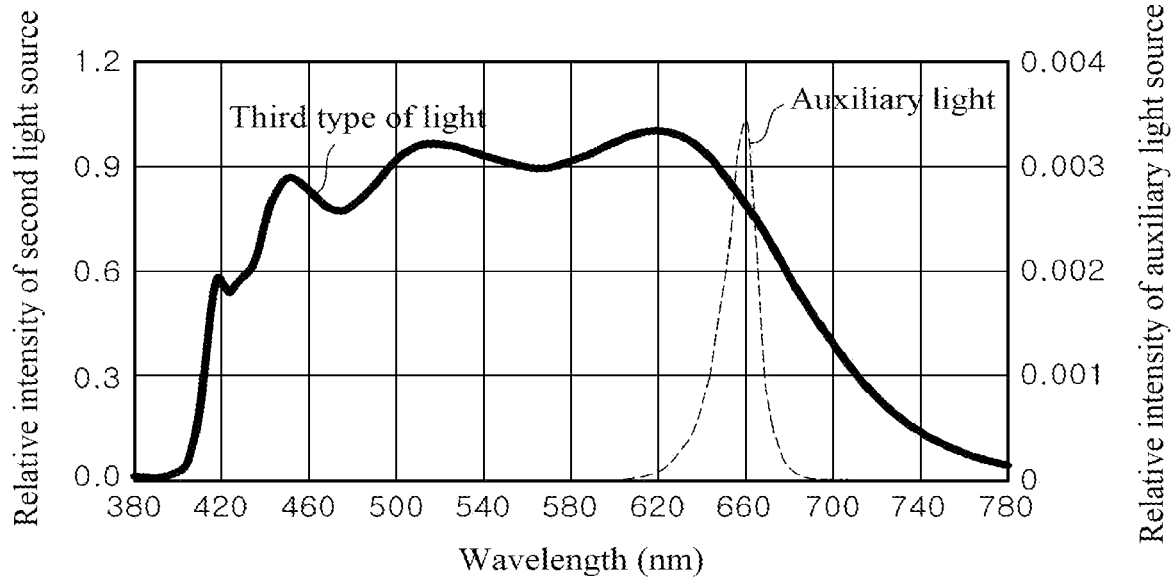
FIG. 13 is an optical spectrum of the fourth light source module according to the present disclosure.

FIG. 12 is a schematic view of a fourth light source module according to the present disclosure. FIG. 13 shows an optical spectrum of the fourth light source module according to the present disclosure.

For example, the fourth light source module 40 may include a substrate 120, a second light source 310, and an auxiliary light source 210.

In the fourth light source module 40, the second light source 310 is a main light source emitting white light.

The second light source 310 of the fourth light source module 40 emits light having the same spectrum as the light from the second light source (310 of FIG. 5) of the third light source module (30 of FIG. 5). In addition, the auxiliary light source 210 of the fourth light source module 40 may emit light having the same spectrum as the light from the auxiliary light source (210 of FIG. 3) of the second light source module (20 of FIG. 3).

Accordingly, the fourth light source module 40 may emit a fourth type of light in which white light from the second light source 310 is mixed with auxiliary light from the auxiliary light source 210.

Referring to FIG. 13, the fourth light source module 40 may emit the fourth type of light having peak wavelengths of about 430 nm or less, about 440 nm to 460 nm, about 510 nm to 530 nm, about 600 nm to 630 nm, and about 630 nm to 670 nm.

For example, the fourth type of light may be light having peak wavelengths of about 418 nm, about 451 nm, about 515 nm, about 617 nm, and about 660 nm.

In addition, the fourth type of light emitted from the fourth light source module 40 may have an irradiance of 200 $\mu mol/m^2/s$. Here, the white light may have an irradiance of 150 $\mu mol/m^2/s$ and the auxiliary light may have an irradiance of 50 $\mu mol/m^2/s$.

Figure 14:
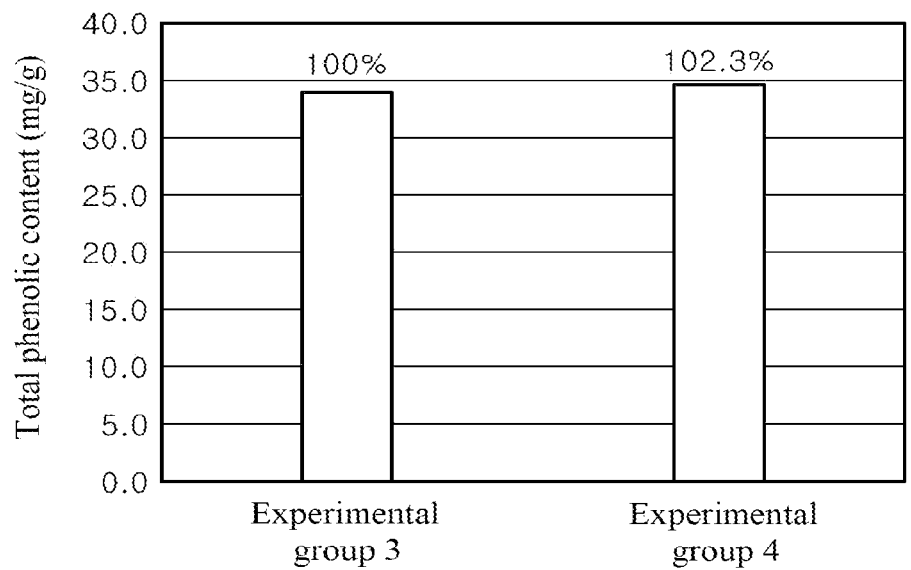
FIG. 14 is a graph showing the total phenolic content per unit weight of plant samples cultivated using the third light source module and the fourth light source module according to the present disclosure.

FIG. 14 is a graph showing the total phenolic content per unit weight of respective red leaf lettuce samples cultivated using the third and fourth light source modules according to the present disclosure.

In FIG. 14, Experimental group 3 is a group of red leaf lettuce samples cultivated using the third light source module (30 of FIG. 5) and Experimental group 4 is a group of red leaf lettuce samples cultivated using the fourth light source module (40 of FIG. 12).

Referring to FIG. 14, the total phenolic content per unit weight was higher in Experimental group 4 than in Experimental group 3.

From this result, it can be seen that the auxiliary light included in the fourth type of light was helpful in increasing the phytochemical content of red leaf lettuce.

According to the embodiments, the third light source module and the fourth light source module may be used as the light source module for plant cultivation. In addition, according to the embodiments of the present disclosure, the light device for plant cultivation may include the third light source module or the fourth light source module.

When a plant is cultivated using the light source module for plant cultivation and the light device according to the embodiments of the present disclosure, the growth and phytochemical content of the plant can be improved. Accordingly, the light source module for plant cultivation and the light device according to the embodiments of the present disclosure can improve the yield of phytochemicals per plant.

Although some embodiments have been described herein, it should be understood that these embodiments are provided for illustration only and are not to be construed in any way as limiting the present disclosure, and that various modifications, changes, alterations, and equivalent embodiments can be made by those skilled in the art without departing from the spirit and scope of the invention.

Therefore, the scope of the present disclosure is not limited to the detailed description of the specification and should be defined by the appended claims and equivalents thereto.

What is claimed is:

1. A light device comprising:
   a main light source module, the main light source module comprising:
      a first element for emitting first light having a first optical spectrum including a peak wavelength in a red color range;

a second element for emitting a second light having a plurality of peak wavelengths in a second optical spectrum; and a third element for emitting a third light having a third optical spectrum;

wherein at least two of the first, second and third optical spectrums are different;

wherein the first optical spectrum includes a total of one or more peaks;

wherein a total number of peaks in the second optical spectrum is greater than the total of one or more peaks in the first optical spectrum;

wherein a peak wavelength of the third optical spectrum is different from a peak wavelength of the first optical spectrum;

wherein an intensity of the peak wavelength of the first optical spectrum is greater than an intensity of a peak wavelength of the second optical spectrum in the same color range; and wherein the main light source module is operable to emit white light by mixing the first light, the second light, and the third light.

2. The light device according to claim 1, wherein an intensity of a peak in a range from 410 nm to 460 nm of the second optical spectrum is different from an intensity of a peak in the range from 410 nm to 460 nm of the third optical spectrum.

3. The light device according to claim 2, wherein the intensity of the peak in the range from 410 nm to 460 nm of the second optical spectrum is smaller than the intensity of the peak in the range from 410 nm to 460 nm of the third optical spectrum.

4. The light device according to claim 1, wherein an intensity of the peak wavelength of the first optical spectrum is greater than an intensity of a peak wavelength of the third optical spectrum in a same color range.

5. The light device according to claim 1, wherein the main light source module further comprises an auxiliary emitter.

6. The light device according to claim 5, wherein the auxiliary emitter has a different irradiance from the third element.

7. A light emitting device, comprising:
a first light source including a first substrate and a first emitter disposed on the first substrate;
a second light source including a second substrate and a second emitter disposed on the second substrate; and
a third light source including a third substrate and a third emitter disposed on the third substrate,
wherein the first emitter comprises a first wavelength converter to reproduce a first light having a first optical spectrum,
wherein the second light emitter comprises a second wavelength converter to reproduce a second light having a second optical spectrum,
wherein the third light emitter emits a third light having a third optical spectrum,
wherein the third optical spectrum includes a total of one or more peaks;
wherein a total number of peaks in the first optical spectrum is greater than the total of one or more peaks in the third optical spectrum,
wherein a peak wavelength of the second optical spectrum is different from a peak wavelength of the third optical spectrum, and
wherein an intensity of a peak in a range from 410 nm to 460 nm of the first optical spectrum is different from an intensity of a peak in the range from 410 nm to 460 nm of the second optical spectrum.

8. The light emitting device of claim 7, wherein the intensity of the peak in the range from 410 nm to 460 nm of the first optical spectrum is smaller than the intensity of the peak in the range from 410 nm to 40 nm of the second optical spectrum.

9. The light emitting device of claim 7, wherein the first wavelength converter is different from the second wavelength converter.

10. The light emitting device of claim 7, wherein the peak wavelength of the third optical spectrum is in a range of red color.

11. The light emitting device of claim 10, wherein an intensity of the peak wavelength of the third optical spectrum is greater than an intensity of a peak wavelength of the first optical spectrum in a same color range.

12. The light emitting device of claim 10, wherein an intensity of the peak wavelength of the third optical spectrum is greater than an intensity of a peak wavelength of the second optical spectrum in a same color range.

13. The light emitting device of claim 7, further comprising an auxiliary emitter.

14. The light emitting device of claim 13, wherein the auxiliary emitter has a different irradiance to the second emitter.

15. The light emitting device of claim 13, wherein the auxiliary emitter has a lower irradiance than the second emitter.

16. A light emitting device, comprising:
a substrate;
a first emitter disposed on the substrate and configured to emit a first light including a first optical spectrum;
a second emitter disposed on the substrate and configured to emit a second light including a second optical spectrum; and
a third emitter disposed on the substrate and configured to emit a third light including a third optical spectrum,
wherein at least two of the first, second, and third optical spectrums are different,
wherein the third optical spectrum includes a total of one or more peaks,
wherein a total number of peaks in the first optical spectrum is greater than the total of one or more peaks in the third optical spectrum,
wherein a peak wavelength of the second optical spectrum is different from a peak wavelength of the third optical spectrum, and
wherein an intensity of a peak in a range from 410 nm to 460 nm of the first optical spectrum is different from an intensity of a peak in the range from 410 nm to 460 nm of the second optical spectrum.

17. The light emitting device of claim 16, wherein the intensity of the peak in the range from 410 nm to 460 nm of the first optical spectrum is smaller than the intensity of peak in the range from 410 nm to 460 nm of the second optical spectrum.

18. The light emitting device of claim 16, wherein the peak wavelength of the third optical spectrum is in a range of red color.

19. The light emitting device of claim 18, wherein an intensity of the peak wavelength of the third optical spectrum is greater than an intensity of a peak wavelength of the first optical spectrum in a same color range.

20. The light emitting device of claim 18, wherein an intensity of the peak wavelength of the third optical spectrum is greater than an intensity of a peak wavelength of the second optical spectrum in a same color range.

* * * * *